United States Patent [19]
Kesavan et al.

[11] Patent Number: 5,891,933
[45] Date of Patent: Apr. 6, 1999

[54] METAL TITANATES FOR FRICTION STABILIZATION OF FRICTION MATERIALS

[75] Inventors: Sunil Kesavan, Troy, Mich.; Gerhard Burmester, Hamburg, Germany

[73] Assignee: AlliedSignal Inc., Morristown, N.J.

[21] Appl. No.: 58,426

[22] Filed: Apr. 9, 1998

[51] Int. Cl.⁶ ...................................................... C08J 5/14
[52] U.S. Cl. .................... 523/158; 524/174; 524/413; 428/293.4; 428/317.1; 428/317.7; 428/704; 428/908.8; 523/149; 523/152; 523/157
[58] Field of Search ...................................... 524/174, 413; 428/293.4, 317.1, 317.7, 704, 908.8; 523/149, 152, 157, 158

[56] References Cited

U.S. PATENT DOCUMENTS

| | | | |
|---|---|---|---|
| 3,859,576 | 1/1975 | Sheckler et al. | 361/231 |
| 4,766,027 | 8/1988 | Burn | 428/210 |
| 4,827,068 | 5/1989 | Chen et al. | 585/408 |
| 4,870,539 | 9/1989 | Chance et al. | 361/321 |
| 5,034,355 | 7/1991 | Tani et al. | 501/92 |
| 5,250,358 | 10/1993 | Lombard et al. | 428/427 |
| 5,512,530 | 4/1996 | Gerdes et al. | 502/351 |

*Primary Examiner*—Samuel A. Acquah

[57] ABSTRACT

Alkali and alkali earth metal titanates used for friction stabilization of friction materials such as, but not limited to, disk brake pads, brake drum linings, clutch disks, and other friction applications are described. Examples of suitable alkali and alkali earth metal titanates include, without limitation, potassium titanate, sodium titanate, and calcium titanate. Preferably, the alkali or alkali earth metal titanates are present in an amount from about 3 volume percent to about 25 volume percent based on the total volume of the friction material matrix.

10 Claims, 1 Drawing Sheet

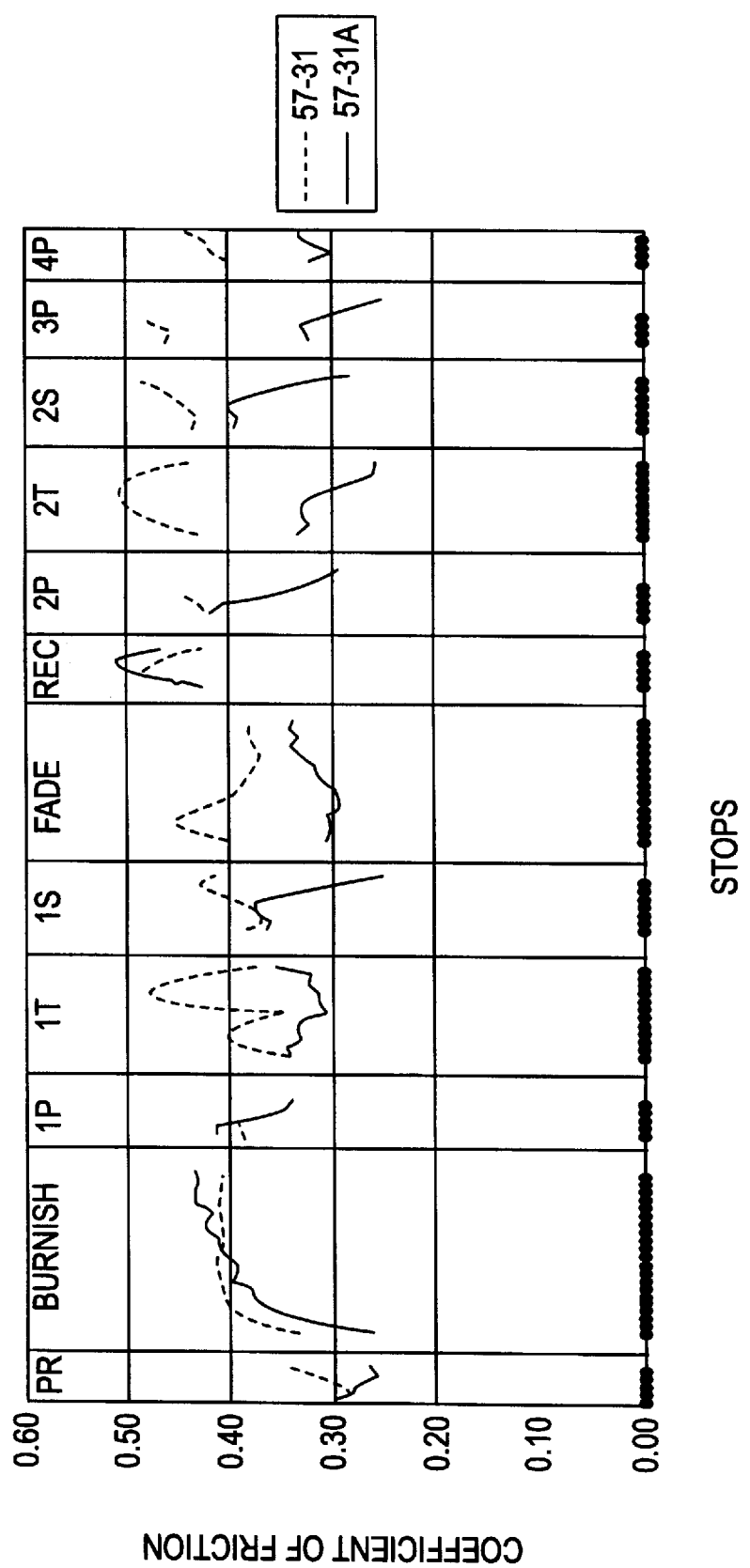

METAL TITANATES FOR FRICTION STABILIZATION OF FRICTION MATERIALS

BACKGROUND OF THE INVENTION

1. Technical Field

This invention relates generally to friction materials and more particularly to metal titanates, especially alkali metal titanates and alkali earth metal titanates, used for friction stabilization of friction materials employed in devices such as disk brake pads, brake drum linings, and other friction applications.

2. Discussion

Friction materials serve in a variety of ways to control the acceleration and deceleration of a variety of vehicles and machines such as, but not limited to, business equipment, bicycles, automobiles, and aircraft. A qualitative analysis of a friction couple suggests that a frictional force is likely to consist of several components such as adhesion tearing, ploughing (or abrasion), elastic and plastic deformation, and asperity interlocking, all occurring at the sliding interface. These mechanisms depend upon the temperature as well as the normal load and sliding speed, since material friction and wear properties are known to be dependent upon at least these variables. In the case of automotive friction materials, the coefficient of friction is usually found to decrease with increasing unit pressure and sliding speed at a given temperature. This decrease in friction is controlled by the composition and microstructure of friction materials.

For a fixed amount of braking, the amount of wear of automotive friction materials tends to increase slightly or remain practically constant with respect to brake temperatures, but once the brake rotor temperature reaches above 200° C., the wear of resin-bonded materials increases substantially and sometimes unpredictably with increasing temperature. This wear is due in part to thermal degradation of organic components. At low temperatures, the practically constant wear rate is primarily controlled by abrasion and adhesion.

Wear is an economic consideration. Wear resistance generally is inversely related to friction and other desirable performance characteristics within any class of friction material. The formulator's objective is typically to provide the highest degree of wear resistance in the normal use temperature range, a controlled moderate increase at elevated temperatures, and a return to the original lower wear rate when temperatures again return to normal with materials that are cost effective. Maximum wear life does not require maximum physical hardness.

In an automotive vehicle, one of the purposes of the friction members is to physically stop the vehicle. These units, including disk brake pads and rotors and brake shoes and drums, convert physical movement into frictional heat. Every wheel contains either a disk or brake drum assembly.

Friction members for brakes are typically made from materials that will produce friction with the rotor or drum and withstand the high temperatures developed during braking. The most common type of friction materials used in brakes and clutches for normal duty is generally termed organic. These organic friction materials usually contain about 30–40 weight % of organic components. One of the main constituents of practically all organic friction materials at one time was asbestos fiber, although small quantities of other fibrous reinforcement may have been used. Since asbestos alone did not offer all of the desired properties, other materials called property modifiers, either abrasive or nonabrasive, were added to provide desired amounts of friction, wear, fade, recovery, noise, and rotor compatibility. A resin binder, such as phenolic or cresylic resin, held the other materials together in a matrix. This binder was not completely inert and made contributions to the frictional characteristics of the composite.

Still another type of friction material, semi-metallics, were introduced in the late 1960s and gained widespread usage in the mid 1970s. These materials usually contain more than 50 weight % metallic components. They are primarily used as friction materials for brake disk pads and blocks for heavy-duty operation. The main constituent of practically all semi-metallics is iron powder in conjunction with steel fiber. Semi-metallics generally contain no asbestos.

Because asbestos has been alleged to be the cause of certain health problems and is no longer environmentally acceptable, most modern brake pads and drum linings are made without asbestos. Thus, most current friction linings are made from synthetic and steel fibers, and iron, ceramic, and metallic powders.

Of recent interest is the use of low-metallic friction materials in disk pads, drum linings, and clutch disks. These materials generally contain less than 40 weight % metallic components. As a result, low-metallic friction materials are generally lighter than semi-metallic friction materials.

Certain titanium-based metal compounds have been previously employed in certain friction applications. These include potassium hexatitanate ($K_2Ti_6O_{13}$) and potassium octatitanate ($K_2Ti_8O_{17}$). These materials have typically been employed in the form of monoclinic crystal systems with a chemically and physically stable tunnel structure. These materials have been commercially available in primarily acicular single crystal (whisker) form, but the potassium hexatitanate has been made available from a melt in a "tabular" shape. Because these friction materials are generally comprised of "needle-like" fibers, it is generally believed that they may potentially produce similar health problems allegedly caused by asbestos.

There exists a continuous need for stable friction materials for use in disk brake pads, brake drum linings, and the like, to improve their overall performance.

It has now been discovered that titanate materials of the general formula —$TiO_3$ are at least equally efficacious and also provide more desirable physical forms in a friction material environment.

The composition and methods of the present invention generally comprise at least two components:

(1) a titanium compound of the formula:
 $M_ATiO_3$, where M is an alkali metal or alkali earth metal, and A is an integer of 1 or 2; and
(2) a friction material binder system, the binder system physically or chemically binding the titanium compound. The composition may optionally employ other conventional friction material constituents, such as a second binder, lubricants, fillers, metal fibers, and the like.

Accordingly, it is at least one object of the present invention to provide a new and improved friction material.

It is another object of the present invention to provide a new and improved semi-metallic friction material.

It is another object of the present invention to provide a new and improved low-metallic friction material.

It is another object of the present invention to provide a new and improved friction material containing certain alkali metal titanates.

It is another object of the present invention to provide a new and improved friction material containing certain alkali earth metal titanates.

It is another object of the present invention to provide a new and improved friction material containing alkali or alkali earth metal titanates, wherein the alkali or alkali earth metal titanates are selected from the group consisting of sodium titanate, potassium titanate, calcium titanate, and mixtures thereof.

It is another object of the present invention to provide a new and improved braking element.

It is another object of the present invention to provide a new and improved automotive disk brake pad.

It is another object of the present invention to provide a new and improved automotive brake drum lining.

It is another object of the present invention to provide a new and improved automotive clutch disk.

In order to overcome the aforementioned disadvantages and achieve the aforementioned objects, the present invention provides a friction material matrix having improved friction stability and surface wear properties, in accordance with the following embodiments.

SUMMARY OF THE INVENTION

In accordance with one embodiment of the present invention, a friction material matrix, comprises:

at least one alkali metal titanate or alkali earth metal titanate of the general formula $M_A TiO_3$, where M is selected from the group consisting of alkali metals or alkali earth metals, and A is an integer of 1 or 2; and at least one binder system, the binder system physically or chemically binding the alkali metal titanate or alkali earth metal titanate.

In accordance with another embodiment of the present invention, a friction material matrix, comprises:

at least one alkali metal titanate or alkali earth metal titanate of the general formula $M_A TiO_3$, where M is selected from the group consisting of alkali metals or alkali earth metals, and A is an integer of 1 or 2, the alkali metal titanate or alkali earth metal titanate being present in an amount of from about 3 volume percent to about 25 volume percent based on the total volume of the friction material matrix; and at least one binder system, the binder system physically or chemically binding the alkali metal titanate or alkali earth metal titanate.

In accordance with yet another embodiment of the present invention, an automotive braking element, comprises:

at least one alkali metal titanate or alkali earth metal titanate of the general formula $M_A TiO_3$, where M is selected from the group consisting of alkali metals or alkali earth metals, and A is an integer of 1 or 2; and at least one binder system, the binder system physically or chemically binding the alkali metal titanate or alkali earth metal titanate.

A more complete appreciation of the present invention and its scope can be obtained from understanding the following brief description of the drawing, detailed description of the invention, and the appended claims.

BRIEF DESCRIPTION OF THE DRAWING

The FIGURE is a graphical illustration of a dynamometer test comparing the coefficient of friction of a friction material containing the alkali metal titanates or the alkali earth metal titanates of the present invention versus a friction material that does not contain any of these titanates.

DETAILED DESCRIPTION OF THE INVENTION

Titanium compounds generally referred to as alkali metal titanates and alkali earth metal titanates are particularly useful in the practice of the present invention. Alkali metal titanates and alkali earth metal titanates have the general formula $M_A TiO_3$, where M is an alkali metal or alkali earth metal, such as potassium, sodium, or calcium, and A is an integer of 1 or 2. Specific examples of alkali metal titanates and alkali earth metal titanates include, without limitation, potassium titanate (e.g., $K_2TiO_3$), sodium titanate (e.g., $Na_2TiO_3$), and calcium titanate (e.g., $CaTiO_3$).

These titanate compounds are typically prepared by reacting (e.g., heating) stoichiometric amounts of titanium dioxide (or the hydrated titanium dioxide) with the alkali metal oxide (or the alkali metal hydroxide, alkali metal carbonate, or in some cases, neutral salts) or alkali earth oxide (or the alkali earth hydroxide, alkali earth metal carbonate, or in some cases, neutral salts) at the correct temperature.

An alkali metal oxide has the general formula $M_2O$, where M is an alkali metal, such as potassium or sodium. For example, potassium titanate may be prepared by heating hydrated titanium dioxide and potassium hydroxide to 160°–170° C. Additionally, potassium titanate and sodium titanate can be prepared by heating a mixture of the appropriate alkali metal carbonate and $TiO_2$ at a prescribed temperature (e.g., 600°–1200° C.) for a given time period. Another method of preparation involves heating the mixture specified above at a temperature of 1200°–1500° C. and then cooling to form crystals. Still another method of preparation involves hydrothermal crystal growth. The appropriate alkali metal hydroxide and $TiO_2$ are heated to 4000°–8000° C. in an aqueous medium at 2000–4000 atm pressure. Other hybrid procedures exist for the production of titanates.

An alkali earth metal oxide has the general formula MO, where M is an alkali earth metal, such as calcium.

Potassium titanate is readily commercially available from Tam Ceramics (Niagara Falls, N.Y.) under the tradename RUFLUX P™. Potassium titanate is also readily commercially available from Chemalloy (Bryn Mawr, Pa.) under the tradename TIFLUXT™. Sodium titanate is readily commercially available from Tam Ceramics (Niagara Falls, N.Y.) under the tradename RUFLUX S™. Additionally, sodium titanate is also commercially available from Chemalloy (Bryn Mawr, Pa.) under the tradename NAFLUX™. Calcium titanate is readily commercially available from Chemalloy (Bryn Mawr, Pa.).

These readily commercially available alkali metal titanates or alkali earth metal titanates typically contain approximately more than 95% of the actual alkali metal titanate or alkali earth metal titanate. However, other materials other than the actual alkali metal titanate or alkali earth metal titanate may also be included such as, but not limited to, silicon dioxide, aluminum oxide, manganese dioxide, iron oxide, zirconium oxide, boron and sulfur.

The use of potassium, sodium, and calcium titanate compounds for friction stabilization of friction materials will be described in detail. The alkali metal titanates and alkali earth metal titanates of the present invention are different from commercially available titanates that have been previously used in friction materials. The physical nature of the product used in the present invention is preferably in the form of a frit. A frit is generally defined as a ground up powder obtained from the fused reaction mixture.

Depending on the chemical composition of the particular alkali metal titanate or alkali earth metal titanate, different particle morphologies can be obtained. Alkali metal titanates or alkali earth metal titanates of the general formula $M_A TiO_3$ (where M is an alkali metal or alkali earth metal, such as potassium, sodium or calcium, and A is an integer of 1 or 2) produced by melting the reactants together and grinding the fused product are the materials preferred in the practice of the present invention. Titanates previously used in the friction industry typically comprised fibers or platelets of the composition $M_A Ti_6 O1_3$ and $M_A Ti_8 O_{17}$ (where M is an alkali metal or alkali earth metal, such as potassium, sodium or calcium, and A is an integer of 1 or 2). These materials may have breathable fibers that either do not degrade or get absorbed in the lungs, and hence are not desirable from a safety perspective. Conversely, the titanates useful in the friction material of the present invention can be employed in essentially any physical form such as platelet, fiber, or powder form depending on the chemical composition. One advantage of the present invention is that unlike the previously discussed titanate compositions, $M_A Ti_6 O_{13}$ and $M_A Ti_8 O_{17}$, the titanates of the present invention need not be in the form of a fiber to be effective.

In accordance with one preferred embodiment of the present invention, an alkali metal titanate or alkali earth metal titanate is present in an amount of about 3 volume % to about 25 volume % based on the total volume of the friction material matrix. In accordance with another preferred embodiment of the present invention, an alkali metal titanate or alkali earth metal titanate is present in an amount of about 10 volume % to about 25 volume % based on the total volume of the friction material matrix. In accordance with another preferred embodiment of the present invention, an alkali metal titanate or alkali earth metal titanate is present in the range of about 10 volume % to about 20 volume % based on the total volume of the friction material matrix. In accordance with a highly preferred embodiment of the present invention, the alkali metal titanate is $K_2 TiO_3$ and is present in an amount of about 15 volume % based on the total volume of the friction material matrix.

Friction materials useful in the practice of the invention may optionally contain one or more thermosetting resinous binders (e.g., phenolic resins such as phenol-formaldehyde resins, epoxies, and the like) present in conventional amounts; reinforcing fibers (e.g., aramid, steel, acrylic, and the like) present in conventional amounts; metal powders (e.g., iron, copper, brass, zinc, aluminum, antimony, and the like) present in conventional amounts; lubricants, preferably solid, (e.g., molybdenum disulfide, graphite, coke, stannic sulfide, antimony trisulfide, and the like) present in conventional amounts; abrasives (e.g., tin oxide, magnesia, silica, iron oxide, alumina, rutile, and the like) present in conventional amounts; organic fillers (e.g., rubber particles, cashew nut shell particles, nitrile rubber particles, and the like) present in conventional amounts; and inorganic fillers (e.g., barytes, gypsum, mica, and the like) present in conventional amounts. Other materials may be added as well, as is known in the art.

As that term is used herein, "friction material matrix" means at least one alkali metal titanate or alkali earth metal titanate useful in the practice of the present invention, at least one binder system (e.g., phenolic resin), and optionally, additives such as, but not limited to, reinforcing fibers, metal powders, lubricants, abrasives, organic fillers, organic fillers, and the like. By way of a non-limiting example, a typical formulation of a low-metallic friction material matrix, in accordance with one embodiment of the present invention, is presented in Example I, below:

EXAMPLE I

| Component | Volume Percent of Friction Material Matrix |
|---|---|
| Fillers | |
| Alkali metal titanate or alkali earth metal titanate (e.g., potassium titanate, sodium titanate, calcium titanate) | 3–25 |
| Barium sulfate | 3–20 |
| Vermiculite | 4–10 |
| Phenolic resin | 8–22 |
| Aramid fiber (Kevlar ™ pulp) | 2–10 |
| Carbonaceous lubricants | |
| Coke | 2–20 |
| Graphite | 2–20 |
| Sulfide lubricants | |
| Molybdenum disulfide | 0.5–6 |
| Antimony trisulfide | 1–8 |
| Inorganic fibers | |
| Glass fiber | 2–10 |
| Mineral fiber | 3–15 |
| Reground rubber tread dust | 3–10 |
| Metal fiber (copper) | 2–8 |
| Cashew nut shell liquid-derived friction dust | 3–18 |

By way of a non-limiting example, a typical formulation of a low-metallic friction material matrix, in accordance with another embodiment of the present invention, is presented in Example II, below:

EXAMPLE II

| Component | Volume Percent of Friction Material Matrix |
|---|---|
| Alkali metal titanate or alkali earth metal titanate (e.g., potassium titanate, sodium titanate, calcium titanate) | 20 |
| Kevlar ™ pulp | 6 |
| Phenolic resin | 18 |
| Coke | 12 |
| Antimony trisulfide | 5 |
| Copper fiber | 6 |
| Cashew dust | 14 |
| Mineral fiber | 8 |
| Rubber dust | 6 |
| Glass Fiber | 5 |

By way of a non-limiting example, a typical formulation of a semi-metallic friction material matrix, in accordance with another embodiment of the present invention, is presented in Example III, below:

EXAMPLE III

| Component | Volume Percent of Friction Material Matrix |
|---|---|
| Fillers | |
| Alkali metal titanate or alkali earth metal titanate (e.g., potassium titanate, sodium titanate, calcium titanate) | 3–25 |
| Barium sulfate | 3–10 |
| Phenolic resin | 8–22 |
| Steel fiber | 2–30 |

EXAMPLE III-continued

| Component | Volume Percent of Friction Material Matrix |
|---|---|
| Carbonaceous lubricants | |
| Coke | 1–25 |
| Graphite | 1–25 |
| Metal powder (iron) | 2–30 |
| Reground rubber tread dust | 3–10 |
| Metal fiber (copper/brass) | 2–8 |
| Cashew nut shell liquid-derived friction dust | 3–18 |

By way of a non-limiting example, a typical formulation of a semi- metallic friction material matrix, in accordance with another embodiment of the present invention, is presented in Example IV, below:

EXAMPLE IV

| Component | Volume Percent of Friction Material Matrix |
|---|---|
| Alkali metal titanate or alkali earth metal titanate (e.g., potassium titanate, sodium titanate, calcium titanate) | 12 |
| Steel fiber | 16 |
| Phenolic resin | 18 |
| Carbonaceous lubricants | |
| Coke | 9 |
| Graphite | 22 |
| Metal fiber (copper/brass) | 2 |
| Metal powder (iron) | 12 |
| Reground rubber tread dust | 4 |
| Cashew nut shell liquid-derived friction dust | 5 |

Referring to the FIGURE, there is shown a graphical illustration of a dynamometer test comparing the coefficient of friction of an automotive brake disk pad having a friction material containing the alkali metal titanates or the alkali earth metal titanates of the present invention versus an automotive brake disk pad having a friction material that does not contain any of these titanates. For testing purposes, the friction material containing the titanates of the present invention was designated as 57-31 (dotted line). The friction material not containing any of the titanates of the present invention was designated as 57-31A (solid line). The dynamometer test consists of several discrete phases: pre-burnish ("PR"); burnish; $1^{st}$ pressure sensitivity ("1P"); $1^{st}$ temperature sensitivity ("1T"); $1^{st}$ speed sensitivity ("1S"); fade; recovery ("REC"); $2^{nd}$ pressure sensitivity ("2P"); $2^{nd}$ temperature sensitivity ("2T"); $2^{nd}$ speed sensitivity ("2S"); $3^{rd}$ pressure sensitivity ("3P"); and $4^{th}$ pressure sensitivity ("4P"). The respective brake assemblies containing the two types of friction materials were actuated a certain number of times during each phase of the dynamometer test at which time a coefficient of friction was determined for each type of friction material for a specific actuation. These actuations, also referred to as stops, were plotted along the x-axis of the Figure. The corresponding coefficient of friction figure was plotted along the y-axis of the Figure. As can be seen from the Figure, the friction material containing the titanates of the present invention (i.e., 57-31) exhibited higher and more stable coefficients of friction throughout virtually all phases of the dynamometer test as compared to the friction material that did not contain any of the titanates of the present invention (i.e., 57-31 A). The friction in the 57-31 material also did not slump with increasing speed as in the case of the 57-31A material. This property of titanate based formulas according to the present invention is desirable.

The alkali metal titanates and alkali earth metal titanates of the present invention can be employed in a number of friction applications and devices such as, but not limited to, brake disk pads, brake drum linings, clutch disks, and the like. Additionally, the alkali metal titanates and alkali earth metal titanates of the present invention can be employed with a number of friction materials such as, but not limited to, asbestos-containing friction materials, asbestos-free friction materials, semi- metallic friction materials, low-metallic friction materials, and the like.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A friction material matrix, comprising:
    at least one alkali metal titanate or alkali earth metal titanate of the general formula $M_A TiO_3$, where M is selected from the group consisting of alkali metals or alkali earth metals, and A is an integer of 1 or 2; and
    at least one binder system, said binder system physically or chemically binding said alkali metal titanate or alkali earth metal titanate.

2. The friction material matrix of claim 1, wherein said alkali metal titanate or alkali earth metal titanate is selected from the group consisting of potassium titanate, sodium titanate, calcium titanate, and mixtures thereof.

3. The friction material matrix of claim 1, wherein said alkali metal titanate or alkali earth metal titanate is present in an amount of from about 3 volume percent to about 25 volume percent based on the total volume of the friction material matrix.

4. The friction material matrix of claim I, further comprising any one of the following components:
    at least one reinforcing fiber;
    at least one metal powder;
    at least one lubricant;
    at least one abrasive;
    at least one organic filler; and
    at least one inorganic filler.

5. The friction material matrix of claim 1, wherein said binder system comprises at least one phenolic resin.

6. A friction material matrix, comprising:
    at least one alkali metal titanate or alkali earth metal titanate of the general formula $M_A TiO_3$, where M is selected from the group consisting of alkali metals or alkali earth metals, and A is an integer of 1 or 2, said alkali metal titanate or alkali earth metal titanate being present in an amount of from about 3 volume percent to about 25 volume percent based on the total volume of the friction material matrix; and
    at least one binder system, said binder system physically or chemically binding said alkali metal titanate or alkali earth metal titanate.

7. The friction material matrix of claim 6, wherein said alkali metal titanate or alkali earth metal titanate is selected from the group consisting of potassium titanate, sodium titanate, calcium titanate, and mixtures thereof.

8. The friction material matrix of claim 6, further comprising any one of the following components:
- at least one reinforcing fiber;
- at least one metal powder;
- at least one lubricant;
- at least one abrasive;
- at least one organic filler; and
- at least one inorganic filler.

9. The friction material matrix of claim 6, wherein said binder system comprises at least one phenolic resin.

10. An automotive braking element comprising:
- at least one alkali metal titanate or alkali earth metal titanate of the general formula $M_A TiO_3$, where M is selected from the group consisting of alkali metals or alkali earth metals, and A is an integer of 1 or 2; and
- at least one binder system, said binder system physically or chemically binding said alkali metal titanate or alkali earth metal titanate.

* * * * *